US012230087B2

(12) United States Patent
Czenomysa et al.

(10) Patent No.: US 12,230,087 B2
(45) Date of Patent: Feb. 18, 2025

(54) ALLOWING ACCESS THROUGH A CONTROLLED-ACCESS POINT

(71) Applicant: MOTOROLA SOLUTIONS, INC., Chicago, IL (US)

(72) Inventors: Ewelina Czenomysa, Cracow (PL); Mateusz Kifer, Konskie (PL); Maciej Schmidt, Dabrowa Tarnowska (PL); Grzegorz Kaplita, Rzeszow (PL); Dariusz Putek, Trzebinia (PL); Rafal Wesolowski-Kuta, Radziszow (PL); Grzegorz Zych, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 71 days.

(21) Appl. No.: 17/822,814

(22) Filed: Aug. 29, 2022

(65) Prior Publication Data

US 2024/0071161 A1     Feb. 29, 2024

(51) Int. Cl.
*G07C 9/28* (2020.01)
*G06V 20/52* (2022.01)
*H04W 8/00* (2009.01)

(52) U.S. Cl.
CPC ............. *G07C 9/28* (2020.01); *G06V 20/52* (2022.01); *H04W 8/005* (2013.01)

(58) Field of Classification Search
CPC .......... G07C 9/28; G06V 20/52; H04W 8/005
USPC ........................................................ 340/5.2
See application file for complete search history.

(56) References Cited

U.S. PATENT DOCUMENTS

| 6,504,470 | B2 |   | 1/2003 | Puchek et al. |
|---|---|---|---|---|
| 7,818,783 | B2 | * | 10/2010 | Davis ................... H04L 63/0853 |
|   |   |   |   | 713/168 |
| 9,697,656 | B2 | * | 7/2017 | Trani ....................... G07C 9/20 |
| 9,710,978 | B1 | * | 7/2017 | Sequeira ............ G07C 9/00896 |
| 10,062,234 | B2 | * | 8/2018 | Bayne ............ G07C 9/27 |
| 10,074,222 | B2 | * | 9/2018 | Raina ....................... G07C 9/20 |

(Continued)

FOREIGN PATENT DOCUMENTS

| AU | 2012257871 B2 | 6/2016 |
|---|---|---|
| FR | 3054709 B1 | 11/2019 |

(Continued)

OTHER PUBLICATIONS

The International Search Report and the Written Opinion, corresponding patent application No. PCT/US2023/027781, filed: Jul. 14, 2023, mailed Nov. 7, 2023, all page.

*Primary Examiner* — Nam V Nguyen

(57) ABSTRACT

An access-control mechanism, wireless device, and method for controlling the access-control mechanism and wireless device is provided herein. During operation the wireless device will create a "group" of devices that will be allowed to enter through a passage barrier without authentication. When authenticating with the access-control mechanism, the wireless device will prove the access-control mechanism with a list of credentials (e.g., identification information) for each device within the group. The access-control mechanism will then determine if every device on the list is allowed entry. If so, non-authenticated entry for a number of devices/people through the passage barrier will be allowed. The number of non-authenticated devices/people allowed to enter will be equal to a number of devices that are in the group.

13 Claims, 5 Drawing Sheets

(56) References Cited

U.S. PATENT DOCUMENTS

| | | | |
|---|---|---|---|
| 10,554,758 B2 | 2/2020 | Barry et al. | |
| 10,657,749 B2* | 5/2020 | Nye | G07C 9/37 |
| 10,850,709 B1* | 12/2020 | Nagata | G07C 9/00563 |
| 11,200,767 B2* | 12/2021 | Boyes | G07C 9/37 |
| 2004/0153671 A1* | 8/2004 | Schuyler | G07C 9/28 |
| | | | 726/9 |
| 2007/0268145 A1 | 11/2007 | Bazakos et al. | |
| 2009/0051528 A1* | 2/2009 | Graichen | G07C 9/38 |
| | | | 340/545.2 |
| 2014/0002236 A1 | 1/2014 | Pineau et al. | |
| 2015/0221147 A1* | 8/2015 | Daniel-Wayman | G07C 9/21 |
| | | | 340/5.54 |
| 2016/0014103 A1* | 1/2016 | Masters | G07C 9/00571 |
| | | | 340/5.61 |
| 2020/0005319 A1 | 1/2020 | Scarborough et al. | |
| 2021/0350639 A1 | 11/2021 | Saripour et al. | |
| 2023/0215230 A1* | 7/2023 | Kam | G07C 9/22 |
| | | | 340/5.61 |

FOREIGN PATENT DOCUMENTS

| | | |
|---|---|---|
| WO | 2018005496 A1 | 1/2018 |
| WO | 2021209674 A1 | 10/2021 |

\* cited by examiner

ALLOWING ACCESS THROUGH A CONTROLLED-ACCESS POINT

RELATED APPLICATIONS

This patent application is related to US Pub No. filed on the same day as the present application.

BACKGROUND OF THE INVENTION

At controlled access points, a passage barrier may be maintained in a closed and locked state by an access-control mechanism. A device operated by a person must authenticate with the access-control mechanism to unlock the passage barrier and gain access for the person. Such controlled access points allow for quick and comfortable access for users. However, at times when queues are long, unnecessary delay may be introduced for access-control mechanisms using wireless technologies. For example, access-control mechanisms using Bluetooth technology for authentication have a physical limitation of ten pre-established connections at a time. This limitation may require users to wait during crowded times to pair with an access-control mechanism. Additionally, while users whose wireless devices have been bonded with a Bluetooth lock can be authenticated under 0.2 millisecond, authentication takes up to 5 seconds for non-bonded devices. Such delays can cause a poor user experience when using a wireless access-control mechanism. With this in mind, it would be beneficial to speed up wireless entry for users queuing to enter through a controlled access point using a wireless access-control mechanism.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
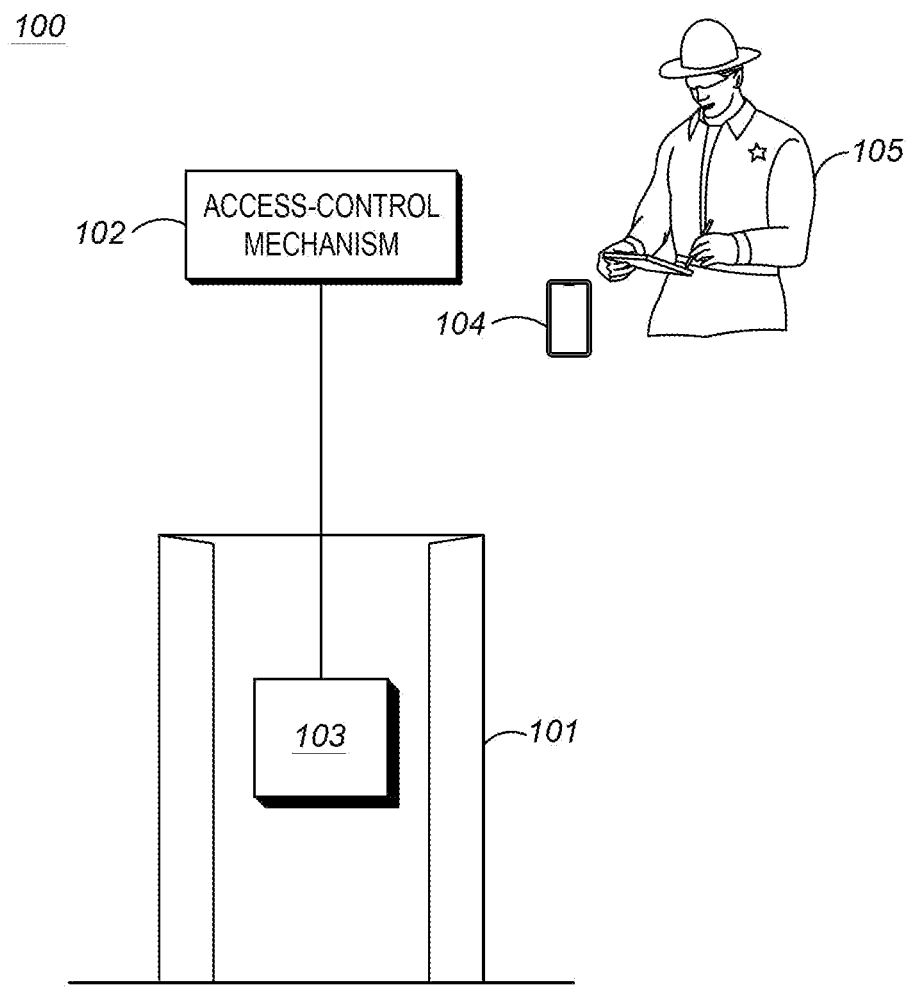
FIG. 1 depicts an environment that incorporates an access-control mechanism.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, an access-control mechanism, wireless device, and method for controlling the access-control mechanism and wireless device is provided herein. During operation the wireless device will create a "group" of devices that will be allowed to enter through a passage barrier without authentication. When authenticating with the access-control mechanism, the wireless device will prove the access-control mechanism with a list of credentials (e.g., identification information) for each device within the group. The access-control mechanism will then determine if every device on the list is allowed entry. If so, non-authenticated entry for a number of devices/people through the passage barrier will be allowed. The number of non-authenticated devices/people allowed to enter will be equal to a number of devices that are in the group.

It should be noted that at a later time the access-control mechanism may verify that all members of the group have indeed passed through the passage barrier. In one embodiment of the present invention, the access-control mechanism will poll each member of the group in order to determine a location of each member, and verify that each member of the group did indeed pass through the passage barrier. If it is determined that the number of members within the group entered, yet a member of the group did not pass through the passage barrier, then security may be notified of the error. In other words, further actions (like security notification, storing log in the system) are required for example, in a situation where 3 members passed through the access control point, 1 did not, and in the place of this 1 person, someone from outside of the group entered.

As mentioned above, when the first device in the group is authenticating with an access-control mechanism, that device will also provide the access-control mechanism with identification information for every device in the group. After identification information is provided for the members of the group by a first device, the other remaining devices in the group will be instructed to not authenticate with the access-control mechanism (e.g., there will be no wireless connation between any remaining device in the group and the access-control mechanism).

If all remaining devices within the group have permission to enter, then the access-control mechanism will allow a number of devices through the passage barrier equal to the number of remaining devices within the group. These devices will not be required to authenticate with the access-control mechanism. For example, if a first device authenticates, and provides proper identification information for six other devices, then the access-control mechanism will authenticate the first device, and allow a total of six other devices (people) through the access barrier without any further authentication (e.g., the six devices will not be authenticated by the access-control mechanism as they pass through the passage barrier). A timeout mechanism may be employed by the access-control mechanism so that non-authenticated devices are only allowed to enter for a predetermined period of time (e.g., 20 seconds).

As an example of the above access technique, assume that Bob goes to lunch with five co-workers. Bob and each co-worker have devices, that when authenticated with an access-control point, allow access to their office building. During lunch, Bob may create a "group" of devices that comprise identification information associated with the five co-workers. When returning to the office building, Bob's will be first to authenticate with the access-control mechanism, however, as part of the authentication, Bob will provide a list of identification information for the other five co-workers. Bob will then be authenticated via standard wireless entry techniques, and able to enter, along with the five co-workers. More particularly, the access-control device will authenticate Bob and determine that the other devices on the list are authorized to enter. The access-control mechanism will then let the five individuals/devices pass through the passage barrier without any further authentication or communication with the access-control mechanism.

The following definitions will be helpful in understanding the concepts presented herein.

Authentication/Authenticate—a process of gaining entry through a passage barrier that requires a wireless device to communicate wirelessly with an access-control mechanism. The process of gaining entry usually comprises bonding the wireless device with the access-control mechanism so that a wireless connection is automatically established between the wireless device and the access-control mechanism in order to provide credentials to the access-control mechanism to gain access.

Identification information—typically a device credential such as a name, token, or any data that can be used to uniquely identify a device. The identification information is typically utilized to determine if the device is allowed to gain access through the passage barrier.

Authorized devices—devices that have permission to enter through a passage barrier.

FIG. 1 depicts an environment 100 that incorporates access control as described above. As shown environment 100 comprises controlled access point 101, access-control mechanism 102, lock 103, wireless device 104, and user 105. Although only one user 105 and one wireless device 104 are shown in FIG. 1, one of ordinary skill in the art will recognize that environment 100 may comprise many users 105 and devices 104.

Passage barrier 101 comprises an entry such a door, where authorized devices 104 along with their user 105 may pass through as described above. For example, access-control mechanism 102 is used to wirelessly authenticate devices 104 associated with persons 105 and send an unlock signal to lock 103 in order to grant access to devices/persons.

In some examples, passage barrier 101 may comprise a door, a double door, a gate, a portal, an entrance, a turnstile, an exit, and the like through which passage is electronically controlled. Passage barrier 101 may be located at an entrance and/or an exit to a building, and the like, through which passage is electronically controlled. While passage barrier 101 is depicted as a physical barrier mechanism, passage barrier 101 may additionally and/or alternatively comprise any suitable non-physical barrier mechanism through which passage is controlled, for example, using electromagnetic fields, disorienting holograms, or another non-visible type of barrier mechanism that may be used to prevent passage. In the depicted examples, passage barrier 101 comprises a physical door that may be electronically locked, unlocked, opened and/or closed.

As shown in FIG. 1, a person 105 carries wireless device 104 which may store identification information used for authentication via short-range wireless techniques as described above, and be configured to interact with the access-control mechanism 102 (such mobile devices will include at least one Bluetooth transmitter/receiver (transceiver)) to authenticate device 104 and allow the authorized person/device 105 entry.

As is evident, access-control mechanism 102 is in communication with lock 103 on passage barrier 101 and controls passage barrier 101 to different states including, but not limited to, an unlocked state, a locked state.

Wireless device 104 may be any suitable computing and communication device configured to engage in wireless communication with access-control mechanism 102, and ultimately to other devices 104 as is known to those in the relevant art. More specifically, wireless device 104 may comprise a well known short-range (e.g., 30 feet of range) transceiver (not shown in FIG. 1) that utilizes any number of network system protocols. For example, wireless device 104 may be configured to utilize Bluetooth communication system protocol, a private 802.11, or any near-field communication technology for communicating with access-control mechanism 102.

As shown in FIG. 1, person 105 carries wireless devices 104 which may store identification information for authentication of device 104 via wireless techniques known in the art. Devices 104 are also configured to interact other devices 104 to create a list of devices (i.e., a list of information for devices 104) so that those devices identified on the list may enter through passage barrier 101 without the need for authentication.

Figure 2:
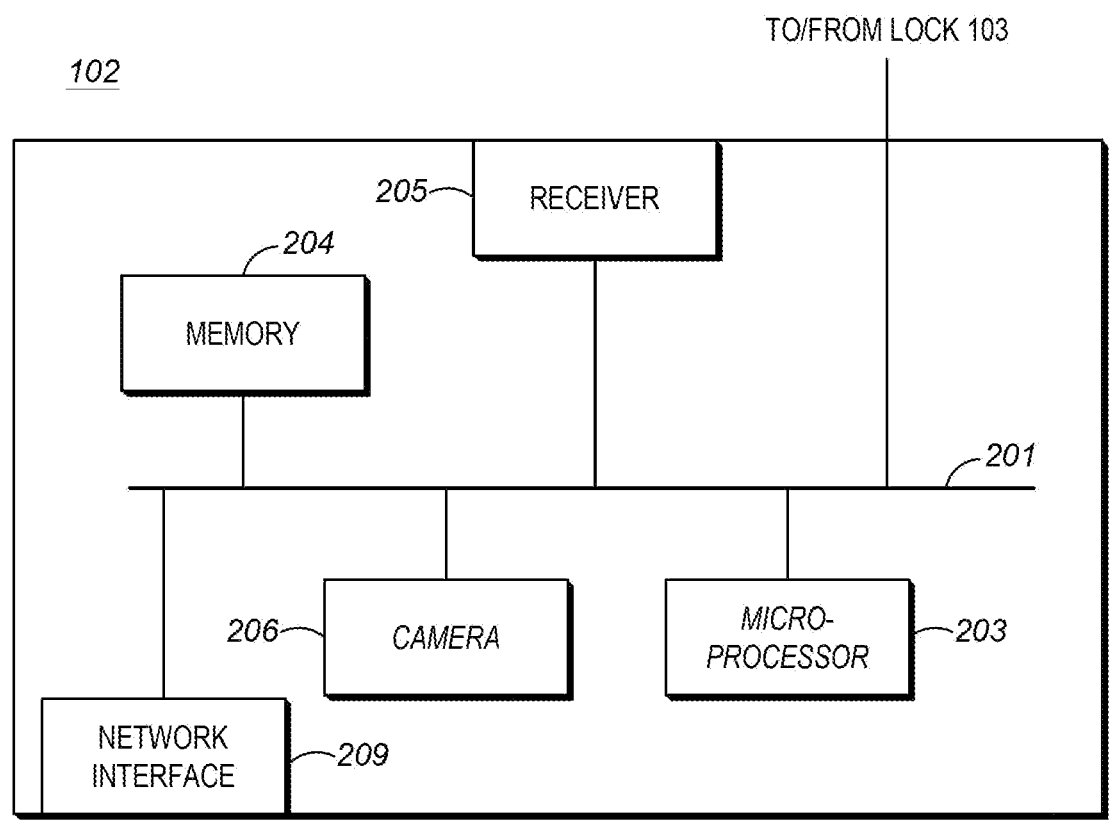
FIG. 2 is a block diagram showing an access-control mechanism for controlling a passage barrier.

FIG. 2 is a block diagram of access-control mechanism 102. Access-control mechanism 102 may include various components connected by bus 201. Such components include, but are not limited to logic circuitry 203, memory 204, wireless transmitter/receiver (transceiver) 205, camera 206, and network interface 209. Hardware processor/microprocessor (logic circuitry) 203 comprises one or more central processing units (CPUs) or other processing circuitry able to provide any of the functionality described herein when running instructions. Logic circuitry 203 may be connected to memory 204 that may include a non-transitory machine-readable medium on which is stored one or more sets of instructions.

Memory 204 may include one or more of static or dynamic storage, or removable or non-removable storage, for example. A machine-readable medium may include any medium that is capable of storing, encoding, or carrying instructions for execution by processor 203, such as solid-state memories, magnetic media, and optical media. Machine-readable medium may include, for example, Electrically Programmable Read-Only Memory (EPROM), Random Access Memory (RAM), or flash memory. Memory 204 is also configured to store identification information used to determine if a device is authorized for entry through passage barrier 101.

The instructions stored in memory 204 may enable access-control mechanism 102 to operate in any manner thus programmed, such as the functionality described specifically herein, when logic circuitry 203 executes the instructions. The machine-readable medium 204 may be stored as a single medium or in multiple media, in a centralized or distributed manner. In some embodiments, instructions may further be transmitted or received over a communications network via a network interface (not shown) utilizing any one of a number of transfer protocols (e.g., frame relay, internet protocol (IP), transmission control protocol (TCP), user datagram protocol (UDP), hypertext transfer protocol (HTTP), etc.).

Transceiver 205 comprises a transmitter/receiver combination that utilizes a short-range communication-system protocol. In other implementations, access-control mechanism 102 may include more, fewer, or different components. Regardless, all components are connected via common data busses 210 as known in the art.

Camera 206 comprises a standard imaging device, and is utilized to determine how many non-authenticated devices pass through passage barrier 101.

Network interface 209 is provided, and comprises elements including processing, modulating, and transceiver elements that are operable in accordance with any one or more standard or proprietary wired or wireless interfaces, wherein some of the functionality of the processing, modulating, and transceiver elements may be performed by means of the logic circuitry 203 through programmed logic such as software applications or firmware stored on the storage component 204 or through hardware. Examples of network interfaces (wired or wireless) include Ethernet, T1, USB interfaces, IEEE 802.11, 5g, etc. Network interface 209 is utilized by logic circuitry 203 to communicate with any wireless device 104 via a local-area network (LAN) or wide-area network (WAN) in order to obtain a location of wireless device 104 to determine if the wireless device 104 passed through a passage barrier 101.

During operation transceiver 205 will pair with a device 104 and receive authentication data (which includes identification information for device 104). As part of the authentication process, device 104 may provide transceiver 205 with identification information for a number of other devices 104 (which may be authorized devices). Logic circuitry 203 will receive the identification information for the other devices 104 and access memory 204 to determine if the other devices 104 are authorized to enter through the passage barrier controlled by access-control mechanism 102. If so, logic circuitry 203 will grant access to device 104 and allow a number of devices/people through the passage barrier without authenticating them. As discussed above, the number of people let through the passage barrier will be the same as the number of other devices. If a device from the number of other devices is not an authorized device, then no one will be allowed to enter without proper authentication.

Camera 206 will be utilized by logic circuitry 203 to identify/count a number of persons/devices who enter through passage barrier 101 without being authenticated. Once the number of persons let through passage barrier 101 matches the number of other devices, no more non-authenticated people will be allowed through passage barrier.

It should be noted that other techniques may be utilized to identify/count the number or persons/devices that enter through passage barrier 101. For example, access-control mechanism 102 could count persons for example via motion sensors, GPS positioning, cell phones counting or methods like detecting the devices based on proximity measured with signal connection strength with the access control mechanisms. Thus, camera 206 may be substituted with any equipment utilized for counting non-authenticated devices/people entering through a passage barrier.

FIG. shows an access-control mechanism that controls access through a passage barrier, the access-control mechanism comprises a wireless transceiver, memory configured to store identification information for devices authorized to pass through the passage barrier, and logic circuitry. The logic circuitry is configured to receive, via the wireless transceiver, authentication information from a first device attempting to pass through the passage barrier, authenticate the first device so that the first device can pass through the passage barrier, receive from the first device via the wireless transceiver, a list of other devices and identification information for the other devices, access the memory to determine if the other devices have permission to pass through the passage barrier, and allow users of the other devices to pass through the passage barrier without wirelessly communicating with the other devices.

The access-control mechanism of FIG. 2 may comprise a camera, and the logic circuitry can be further configured to utilize the camera to determine a number of users that passed through the passage barrier. As described above, other techniques may be utilized to determine the number of users that pass through the passage barrier.

Additionally, the logic circuitry is further configured to use the camera (or other equipment) to count the users of the other devices who pass through the passage barrier and lock the passage barrier when a number of users who passed through the passage barrier equals a number of other devices on the list.

A network interface may be employed by the logic circuitry, and configured to receive location information from the other devices. This will be utilized to determine a location for the other devices in order to determine if the other devices have passed through the passage barrier.

Finally, a lock is provided, and the logic circuitry is further configured to allow the users of the other devices to pass through the passage barrier by sending an unlock command to the lock.

Figure 3:
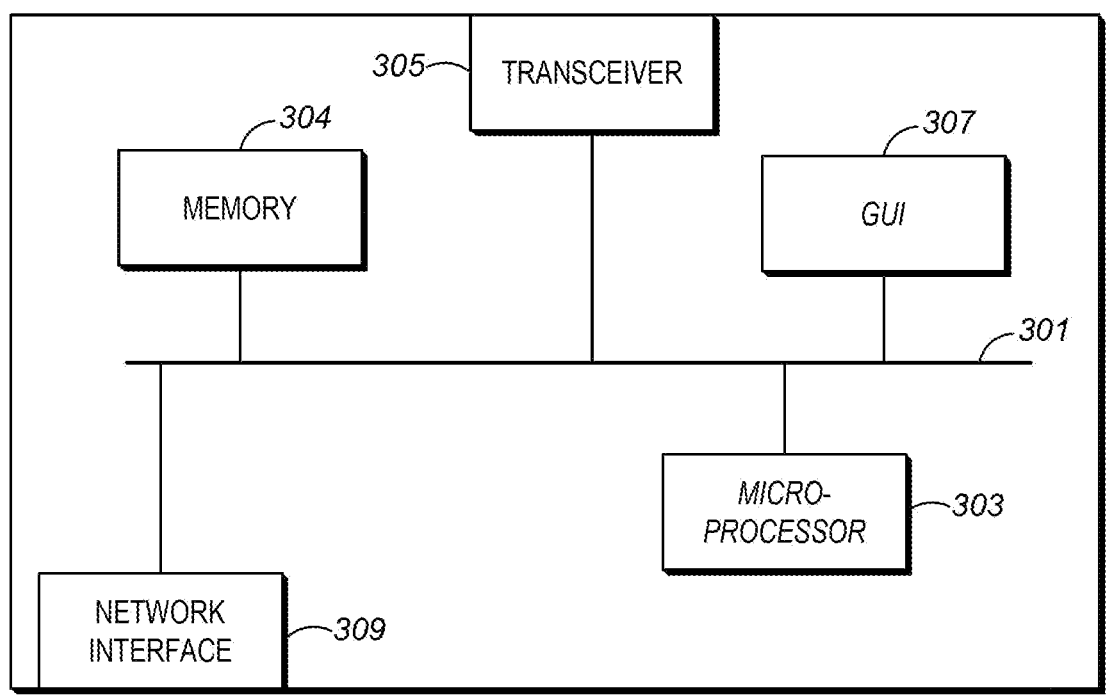
FIG. 3 is a bock diagram of a wireless device used to gain access through a passage barrier.

FIG. 3 is a block diagram of a device 104. Device 104 has similar components to those in access-control mechanism 102. Device 104 additionally includes graphical-user interface (GUI) 307. GUI 307 provides a man/machine interface for receiving an input from a user and displaying information. For example, GUI 506 may provide a way of receiving and conveying (e.g., displaying) a list of devices 104 that was created to expedite entry through a controlled access point as described above. In order to provide the above features (and additional features), GUI 307 may comprise any combination of a touch screen, a computer screen, a keyboard, or any other interface needed to receive a user input and provide information to the user.

During operation, a user of device 104 may utilize GUI 307 to create a group of devices 104 that will gain access through a controlled access point without being authenticated. In its simplest form, a user may utilize GUI 307 to enter a list of identification information for a plurality of devices that will form the group. In other embodiments, the group of devices may be formed in other ways. Some of the ways that the group of devices may be formed follows:

Forming a group from nearby devices—Logic circuitry 303 may utilize transceiver 305 to "sniff" for nearby devices. For example, if transceiver 305 uses a Bluetooth communications protocol, then advertising devices, say, within 10 meters may be detected and automatically added to the list. Identification information for various devices may be pre-stored in memory 304 so that logic circuitry 303 will be able to easily create a list of nearby devices and their associated identification information (e.g., Bob Smith, ID #44334419493).

Forming a group from historical data—Access-control mechanism 102 may analyze which devices enter and/or leave together and send a request to those devices via network interface 209 to create group. Identification information for members of the group will also be provided as part of the request.

Forming a group from a camera view—Persons may be identified within a camera view (e.g., a view from camera 206), and those person's devices may be sent a request via network interface 209 to form a group. Identification information for members of the group will also be provided as part of the request.

Forming a group based on device location—Logic circuitry 203 may be provided with location information for multiple devices via network interface 209. Those devices determined to be physically close by each other may be sent a request via network interface 209 to form a group. Identification information for members of the group will also be provided as part of the request.

Notwithstanding how members of a group are formed, logic circuitry 303 will determine group members and their associated identification information. The first member of the group to establish a connection with the access-control mechanism 102 will immediately send a message to the other devices within the group to not connect with the access control mechanism for a predetermined period of time (e.g., 30 seconds). Thus, when approaching access-control mechanism 102, if a message to not connect is received, logic circuitry 303 will prevent connection to access-control point 102. However, if a message to not connect is not received, then device 104 can assume that it is the first device from the group to establish a connection with access-control mechanism 102. Logic circuitry 303 will immediately send a message to devices in the group to instruct the group members not to connect with access control mechanism 102 for a predetermined period of time. At this point, logic circuitry 303 will utilize transceiver 305 to send a list of member devices within the group to access-control mechanism 102 along with their associated identification information. This will cause access-control mechanism 102 to authenticate device 104 and allow all members of the group to enter without authenticating them.

With the above in mind, the wireless device of FIG. 3 comprises a wireless transceiver, memory, and logic circuitry. The logic circuitry is configured to create a list of devices, wherein the list of devices comprises identification information for each device on the list, wherein the identification information is utilized by an access-control mechanism to allow access through a passage barrier. store the list within the memory, authenticate with the access-control mechanism in order to gain entry through the passage barrier, and provide the list to the access-control mechanism, so that the access-control mechanism can grant access through the passage barrier to users of the devices on the list without communicating (wired or wirelessly) with the devices on the list.

A graphical-user interface (GUI) may be provided with the logic circuitry creating the list of devices by receiving user input via the GUI identifying the devices on the list. Additionally, a network interface may be provided with the logic circuitry creating the list of devices by receiving the list via the network interface from the access-control mechanism.

As discussed above, the access-control mechanism grants access through the passage barrier to users of the devices on the list without communicating with the devices on the list by counting a number of users who pass through the passage barrier and locking the passage barrier when the number of users who passed through the passage barrier equals a number of other devices on the list. Additionally, the logic circuitry creates the list prior to authenticating.

Figure 4:
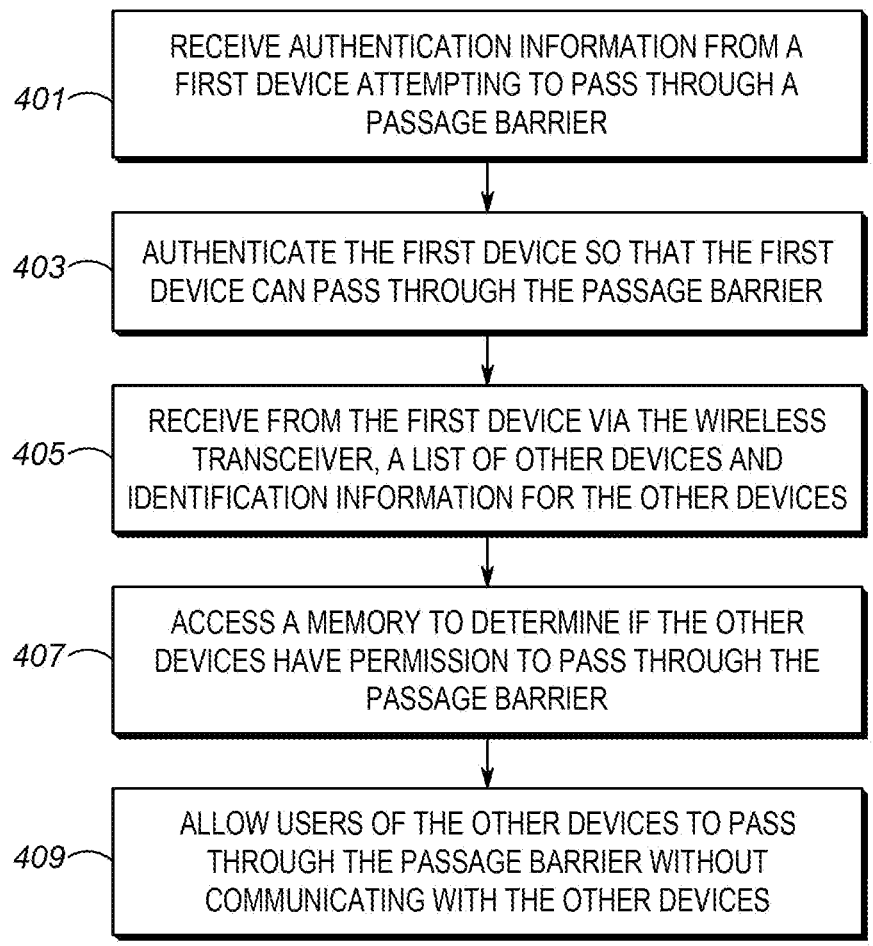
FIG. 4 is a flow chart showing operation of the access-control mechanism of FIG. 2.

FIG. 4 is a flow chart showing operation of the access-control mechanism of FIG. 2. The logic flow begins at step 401 where logic circuitry 203 receives, via wireless transceiver 205, authentication information from a first device attempting to pass through a passage barrier. At step 403, logic circuitry 203 authenticates the first device so that the first device can pass through the passage barrier. The logic flow continues to step 405 where logic circuitry 203 receives from the first device via the wireless transceiver, a list of other devices and identification information for the other devices, accesses a memory to determine if the other devices have permission to pass through the passage barrier (step 407), and allows users of the other devices to pass through the passage barrier without communicating with the other devices (step 409).

The step of "allowing" users to pass through the passage barrier comprises the step of unlocking a lock to the passage barrier. Additionally, as described above, a camera can be utilized to determine a number of users that passed through the passage barrier and the passage barrier can be locked when a number of users who passed through the passage barrier equals a number of other devices on the list.

Figure 5:
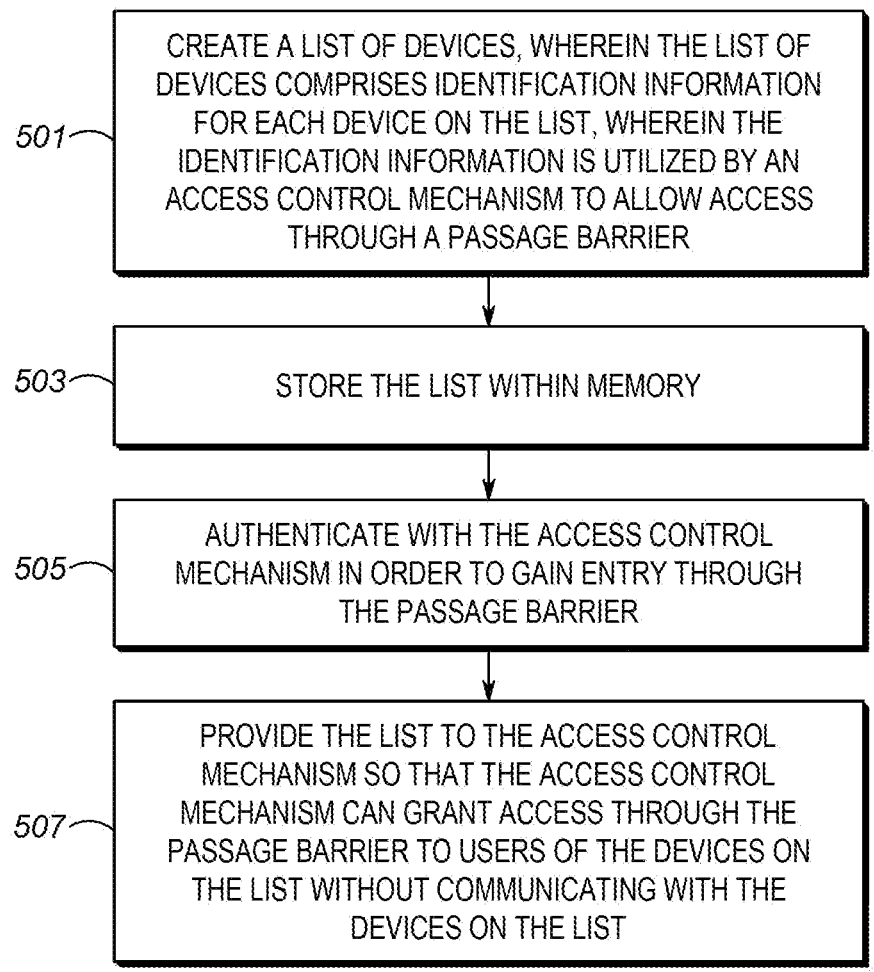
FIG. 5 is a flow chart showing operation of the wireless device of FIG. 3

FIG. 5 is a flow chart showing operation of the wireless device of FIG. 3. The logic flow begins at step 501 where logic circuitry 303 creates a list of devices, wherein the list of devices comprises identification information for each device on the list, wherein the identification information is utilized by an access-control mechanism to allow access through a passage barrier.

At step 503, logic circuitry 303 stores the list within memory 304 and authenticates with the access-control mechanism 102 in order to gain entry through the passage barrier (step 505). The list is provided to the access-control mechanism at step 507, so that the access-control mechanism can grant access through the passage barrier to users of the devices on the list without communicating with the devices on the list.

As discussed above, the step of creating the list may comprise the step of creating the list by receiving user input via a GUI identifying the devices on the list. Additionally, the step of creating the list comprises the step of creating the list by receiving the list via a network interface from the access-control mechanism. Additionally, as mentioned above, the access-control mechanism grants access through the passage barrier to users of the devices on the list without communicating with the devices on the list by counting a number of users who pass through the passage barrier and locking the passage barrier when the number of users who passed through the passage barrier equals a number of other devices on the list.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An access-control mechanism that controls access through a passage barrier, the access-control mechanism comprising:
   a wireless transceiver;
   memory configured to store identification information for devices authorized to pass through the passage barrier;
   logic circuitry configured to:
      receive, via the wireless transceiver, authentication information from a first device attempting to pass through the passage barrier;
      authenticate the first device so that the first device can pass through the passage barrier;
      receive from the first device via the wireless transceiver, a list of other devices and identification information for the other devices, wherein the other devices are not in wireless communication with the wireless transceiver;
      access the memory to determine if the other devices have permission to pass through the passage barrier; and
      allow users of the other devices to pass through the passage barrier based on the identification information being indicative of the other devices being allowed to enter.

2. The access-control mechanism of claim 1 further comprising:
   a camera; and
   wherein the logic circuitry is further configured to utilize the camera to determine a number of users that passed through the passage barrier.

3. The access-control mechanism of claim 1 wherein the logic circuitry is further configured to:
   count the users of the other devices who pass through the passage barrier; and
   lock the passage barrier when a number of users who passed through the passage barrier equals a number of other devices on the list.

4. The access-control mechanism of claim 1 further comprising:
   a network interface configured to receive location information from the other devices, and
   wherein the logic circuitry is further configured to:
      utilize the network interface to determine a location for the other devices in order to determine if the other devices have passed through the passage barrier.

5. The access-control mechanism of claim 1 further comprising:
   a lock; and
   wherein the logic circuitry is further configured to allow the users of the other devices to pass through the passage barrier by sending an unlock command to the lock.

6. A method comprising the steps of:
   receiving, via a wireless transceiver, authentication information from a first device attempting to pass through a passage barrier;

authenticating the first device so that the first device can pass through the passage barrier;

receiving from the first device via the wireless transceiver, a list of other devices and identification information for the other devices, wherein the other devices are not in wireless communication with the wireless transceiver;

accessing a memory to determine if the other devices have permission to pass through the passage barrier; and allowing users of the other devices to pass through the passage barrier based on the identification information being indicative of the other devices being allowed to enter.

7. The method of claim 6 further comprising the step of:
utilizing a camera to determine a number of users that passed through the passage barrier.

8. The method of claim 6 further comprising the step of:
locking the passage barrier when a number of users who passed through the passage barrier equals a number of other devices on the list.

9. The method of claim 6 further comprising the step of:
utilizing a network interface to determine a location for the other devices in order to determine if the other devices have passed through the passage barrier.

10. The method of claim 6 wherein the step of allowing the users of the other devices to pass through the passage barrier comprises the step of sending an unlock command to the lock.

11. An apparatus comprising:
a camera;
a wireless transceiver;
memory configured to store identification information for devices authorized to pass through a passage barrier;
logic circuitry configured to:
  receive, via the wireless transceiver, authentication information from a first device attempting to pass through the passage barrier;
  authenticate the first device so that the first device can pass through the passage barrier;
  receive from the first device via the wireless transceiver, a list of other devices and identification information for the other devices, wherein the other devices are not in wireless communication with the wireless transceiver;
  access the memory to determine if the other devices have permission to pass through the passage barrier;
  allow users of the other devices to pass through the passage barrier based on the identification information being indicative of the other devices being allowed to enter;
  utilize the camera to determine a number of users that passed through the passage barrier;
  count the users of the other devices who pass through the passage barrier; and
  lock the passage barrier when a number of users who passed through the passage barrier equals a number of other devices on the list.

12. The apparatus of claim 11 further comprising:
a network interface configured to receive location information from the other devices, and
wherein the logic circuitry is further configured to:
  utilize the network interface to determine a location for the other devices in order to determine if the other devices have passed through the passage barrier.

13. The apparatus of claim 11 further comprising:
a lock; and
wherein the logic circuitry is further configured to allow the users of the other devices to pass through the passage barrier by sending an unlock command to the lock.

* * * * *